United States Patent [19]

Ambrogi

[11] 4,248,925
[45] Feb. 3, 1981

[54] ENCAPSULATION IN GLASS AND GLASS-CERAMIC MATERIALS

[75] Inventor: Raymond R. Ambrogi, Corning, N.Y.

[73] Assignee: Corning Glass Works, Corning, N.Y.

[21] Appl. No.: 51,712

[22] Filed: Jun. 25, 1979

[51] Int. Cl.³ ............................................. C03B 19/00
[52] U.S. Cl. ........................................ 428/212; 65/33; 65/36; 65/47; 65/48; 428/68; 428/76; 428/408; 428/218; 428/426
[58] Field of Search ................ 65/36, 42, 43, 45, 47, 65/48, 33; 428/67, 68, 76, 212, 408, 218, 426

[56] References Cited

U.S. PATENT DOCUMENTS

| | | | |
|---|---|---|---|
| 314,828 | 3/1885 | Haines | 65/146 |
| 502,461 | 8/1893 | Irwin | 65/156 |
| 2,219,573 | 10/1940 | Fraenckel | 65/43 |
| 2,920,971 | 1/1960 | Stookey | 106/39.0 |
| 3,305,335 | 2/1967 | Jewell et al. | 65/51 |
| 3,309,123 | 3/1967 | Edwards | 65/23 X |
| 3,410,989 | 11/1968 | Laws, Jr. | 219/438 |
| 3,681,187 | 8/1972 | Bowen | 65/23 X |
| 4,018,612 | 4/1977 | Chyung | 106/39.7 |

OTHER PUBLICATIONS pp. 19–26, The Glass Industry, Apr. 1978, Mechanical & Chemical Aspects of Glass Sealing, Part II.

*Primary Examiner*—Arthur D. Kellogg
*Attorney, Agent, or Firm*—Burton R. Turner; John P. DeLuca

[57] ABSTRACT

In the encapsulation of insert materials within glass and glass-ceramic articles, not only must the bonding characteristics between the insert and the glass or glass-ceramic materials be considered, but also the relative coefficient of thermal expansions between the insert and the encapsulating materials must be programmed in order to avoid undue stresses in the article or the insert which could produce deleterious results.

11 Claims, 6 Drawing Figures

ENCAPSULATION IN GLASS AND GLASS-CERAMIC MATERIALS

BACKGROUND OF THE INVENTION

Various forms of encapsulating materials in glass articles have been known in the past, such as shown by the ornamental glass bottle of U.S. Pat. No. 502,461, the wired glass ribbon of U.S. Pat. No. 3,305,335, and the heat transfer cooking insert of U.S. Pat. No. 3,410,989. In addition to the full encapsulation of materials in glass articles as shown in the aforementioned patents, it is also known to seal or secure articles in molten glass during forming, such as shown in U.S. Pat. Nos. 314,828 and 2,219,573, and as suggested on page 22 of THE GLASS INDUSTRY, April 1978.

In U.S. Pat. No. 314,828, a charge of molten glass is deposited in a mold and a plunger carrying a metallic shank descends into the molten glass for the purpose of pressing the molten glass into the shape of a glass knob and embedding one end of the shank therewithin. U.S. Pat. No. 2,219,573, on the other hand, discloses the formation of a glass panel having an integral metal frame by positioning the frame within a mold and pressing a gob of molten glass into contact therewith so as to embed an inner peripheral flange of such frame within the glass panel. Such patent also discloses the positionment of pins within a mold assembly so as to press form a gob thereabout and integrally seal the pins in the thus formed glass body. THE GLASS INDUSTRY article entitled "The Mechanical and Chemical Aspect of Glass Sealing—Part II" by Marcus T. Borom (pp. 19–26) indicates on page 22 that from a manufacturing standpoint it is possible to form a ceramic-to-metal seal by embedding metal hardware in a mold, casting glass about it, and transforming the part to a glass-ceramic.

As can be seen from the foregoing prior art, not only did a variety of reasons exist for the desirability of encapsulating or sealing different materials within glass articles, but also a variety of materials which could be encapsulated were suggested including metal, silicon and graphite. However, although the prior art references are concerned with the encapsulation of materials within molten glass, none of the references except U.S. Pat. No. 2,219,573 and THE GLASS INDUSTRY article concerns itself with the differential expansion between the insert and the glass. The patent merely indicates that the metal insert should preferably have the same or similar coefficient of expansion as the glass to which it is to be bonded, whereas the article sets forth the complexity that is involved when encapsulating a metal within a glass having one coefficient of expansion which is then converted into a glass-ceramic having another coefficient of expansion. The article sets forth the desired end result of having the thermal properties of the insert material match that of the glass-ceramic to obtain a balanced seal in a bonded structure, but does not indicate a practical way of obtaining such end result or discuss the problems involved when the insert is not bonded to the glass or glass-ceramic material.

It thus has been an object of the present invention to set forth critical parameters which must be considered during the encapsulation of materials within glass and glass-ceramic articles and to set forth a method of encapsulating inserts within molten glass articles which are subsequently converted into glass-ceramic articles.

SUMMARY OF THE INVENTION

In its simplest form, the present invention sets forth process guidelines for producing glass and glass-ceramic articles from molten glass with inserts encapsulated therein, and wherein processing parameters, thickness of materials, the bonding characteristics between the article and the insert, their relative coefficients of expansion, and the thermal conductivity and modulus of elasticity of the insert are taken into consideration so as to produce a virtually stress-free final composite article.

Since the manufacture of glass-ceramic vessels for use as top-of-the-stove cookware having heat conducting inserts encapsulated therein for purposes of good uniform heat transfer is contemplated by the present invention, an object of the invention has been to maintain the glass or glass-ceramic material of the article about the insert material as intimately as possible for good heat transfer, but without inducing stress. Accordingly, the insert material must be such that its modulus of elasticity and expansion coefficient not only compensate for the stress and deformation caused by the shrinkage of the glassy material when it is converted into a glass-ceramic, but also minimize thermally induced stresses when the article is heated during cooking.

Although various insert materials have been considered which both bond to and do not bond to the glassy article, graphite and low expansion materials coated with graphite are deemed to be the best insert candidates for glass-ceramic articles for use in top of the range cooking. Such inserts do not appear to chemically or fusion bond to the glassy material although some mechanical bonding due to surface irregularities may exist, and accordingly there is virtually no shear stress developed at the insert-glass interface. Therefore, a preferred embodiment includes the use of a graphite insert of low elastic modulus which does not so bond to the molten glass during forming, and which has a preselected expansion coefficient which is not only greater than the coefficient of expansion of the subsequently formed glass-ceramic, but which is selected to compensate for stresses resulting from the shrinkage of the material which develop during the ceramming cycle, such that as the article is cooled down from the ceramming cycle the insert will shrink sufficiently to relieve such stresses and produce a virtually stress-free composite glass-ceramic article with an insert fully encapsulated in intimate contact therewithin.

DESCRIPTION OF THE PREFERRED EMBODIMENTS

The concepts of the present invention relate to the encapsulation of materials in both glass and glass-ceramic articles wherein the materials either bond to, or do not bond to, the molten glass and glass-ceramic materials forming the articles during the encapsulation process. That is, the encapsulation of the insert is accomplished by means of a hot glass process using molten glass such as shown in the previously cited art or preferably as described in my copending U.S. application Ser. No. 51,711, filed on even date, entitled Press Forming Glass Articles Having Encapsulated Material. With respect to glass articles, the insert may either chemically or fusion bond to the glass during the encapsulation process, such as is the case with metal inserts, or an insert such as graphite may be utilized which does not so bond to the glass. That is, although graphite may exhibit some mechanical bonding due to surface irregularities, it is not deemed to bond to the glass since it does not result in the chemical or fusion bonding experienced in glass to metal seals.

When the insert does in fact bond to the glass during the encapsulation process, the coefficient of thermal expansion of the insert must be substantially equal to the coefficient of thermal expansion of the glass. Accordingly, since both the glass and the insert expand and contract at the same rate, the bonding of the insert to the molten glass during the forming operation will result in zero stress at room temperature. However, if there is an expansion difference, stress will be developed in the glass and the insert, and as the difference in the expansion increases, the stress will increase until either the glass or the insert fails. That is, should the differential expansions along the bonded surface between the glass and the insert place the glass in tension, the article would probably crack and fail unless the tension were minimal and confined centrally thereof; whereas were the insert placed in tension, there is a possibility that it could crack and relieve the tension without deleteriously destroying the product.

When there is no chemical or fusion bonding between the insert and the glass, no shear stresses can develop at the interface of the glass and insert which could cause deleterious results. Further, if the coefficient of thermal expansion of the insert is equal to or greater than that of the glass within which it is encapsulated, there will be no stress formed in the composite article. That is, in the case of an insert having a higher coefficient of thermal expansion than the glass, as the semimolten glass article containing the insert cools from the encapsulation temperature to room temperature, the insert merely contracts more than the surrounding glass and pulls away therefrom leaving a small cavity thereabout.

Figure 1:
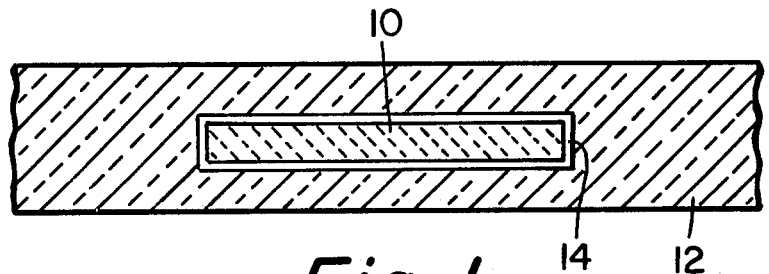
FIG. 1 is a fragmental elevational view in section illustrating the encapsulation of an insert within a glass article, wherein the insert is not bonded to the glass and wherein the insert has a coefficient of thermal expansion greater than that of the glass forming the article.

FIG. 1 illustrates this phenomena wherein an insert 10, such as graphite which does not bond to the glass material of article 12, has a coefficient of thermal expansion greater than that of the glass, and upon cooling from a molten encapsulating condition contracts at a faster rate than the glass to form a cavity 14 thereabout within the article 12. Accordingly, at room temperature the insert 10 may have slight movement within the article 12 due to the cavity 14 formed about the insert, and as a practical matter such cavity may be a detriment to the strength of the article and as such may be undesirable. That is, the cavity and free movement of the insert materially reduces the articles resistance to impact failure. However, when the article 12 is periodically subjected to heat, such as would be the case if the article were a cooking vessel, the insert 10, having a greater coefficient of thermal expansion than the glass 12, would expand within the cavity 14 and possibly substantially fill such cavity providing good heat transfer but without creating any stress.

Figure 2:
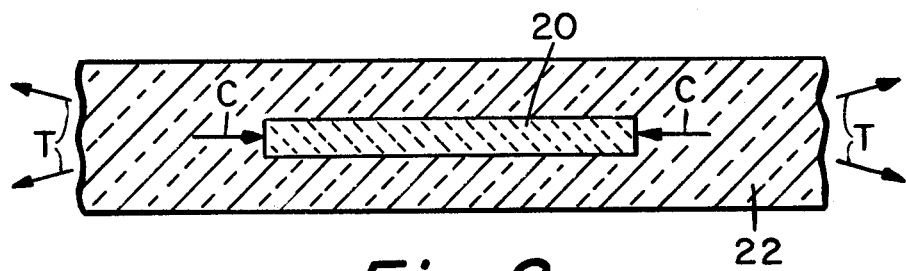
FIG. 2 is a fragmental elevational view in section illustrating the encapsulation of an insert within a glass article wherein the insert, which is not bonded to the glass article, has a coefficient of thermal expansion less than that of the glass forming the article.

Should the insert have a coefficient of thermal expansion which is less than that of the glass, and again assuming no bonding between the glass and the insert, a tensile stress will be produced centrally in the glass upon the cooling of the semimolten glass from the encapsulation temperatures. That is, since the glass composition has a greater coefficient of thermal expansion than the insert, upon cooling the glass will attempt to contract more than the insert, thus putting the insert into compression and the glass into tension, which if present at the surface usually results in deleterious consequences. As shown in FIG. 2, insert 20 which does not bond to the glass and has a coefficient of thermal expansion less than that of the glass composition forming article 22, is compressed by the glass of article 22 as the glass cools from the molten encapsulation temperatures and contracts about the insert, thus subjecting it to compression as represented by arrows C. The insert 20, however, creates tensile forces on the glass article 22 as represented by arrows T. This type of arrangement should usually be avoided, since it is known that glass breaks in tension.

When encapsulating an insert within a glassy material which is subsequently cerammed by a heat treatment cycle into a glass-ceramic material, not only is the mechanism complicated by the fact that the glass-ceramic material has a coefficient of thermal expansion which is less than that of its glassy state, but also a volume shrinkage accompanies the ceramming operation. Thus, at the elevated ceramming temperatures, crystal growth occurs with a corresponding volumetric shrinkage of the article around the insert. The amount of stress developed at the elevated ceramming temperatures depends upon the time involved, the growth rate of the crystals, and the viscosity of the material. Many glass-ceramic compositions and ceramming cycles which may be used with the present invention are now well known in the art, such as set forth in U.S. Pat. Nos. 2,920,971 and 4,018,612.

Since the coefficient of thermal expansion of the encapsulating material while in its glassy state may be about $30-35 \times 10^{-7}/°C.$, whereas the coefficient of thermal expansion for the cerammed or glass-ceramic state may be about $10-12 \times 10^{-7}°C.$, it becomes apparent that where the insert material bonds to the molten glass during encapsulation, the coefficient of thermal expansion of such insert material must be similar to that of the glassy state in order to prevent the buildup of stresses during the cooling down of the newly formed glassy article, which stresses would otherwise occur if the coefficients of thermal expansion were not compatible. Accordingly, the bondable insert material will normally have a coefficient of thermal expansion which is substantially higher than the coefficient of thermal expansion of the glass-ceramic material in its cerammed state. Thus, as the glassy article is cerammed, it not only undergoes a volumetric shrinkage about the insert of about 1% to 4%, but also since the insert has a higher coefficient of thermal expansion, it will attempt to contract or shrink away from the glass-ceramic surface to which it is bonded. Due to the bonding between the glass-ceramic and the insert, however, the glass-ceramic does not permit the insert to shrink, and therefore the insert is put under tension. The resultant stress within the insert must be relieved by some mechanism, and in the case of a silicon insert, microcracking of the insert is occasioned upon the cooling of the glass-ceramic article, thereby relieving the tensile stresses built up within the insert during the cooling cycle.

Figure 3:
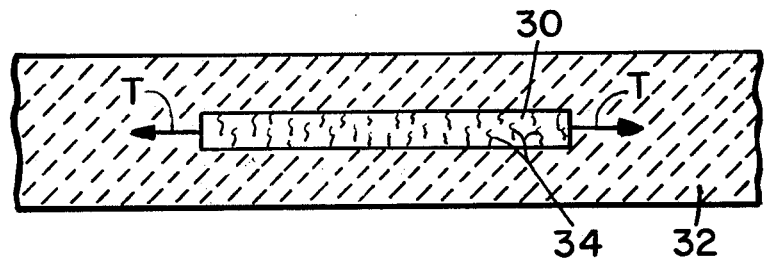
FIG. 3 is a fragmental elevational view in section illustrating the encapsulation of an insert within a glass ceramic article, wherein the insert is bonded to the glass-ceramic and has a coefficient of thermal expansion greater than that of both the glass and the glass-ceramic from which the article is formed.

Referring now to FIG. 3, an insert 30 of silicon or other suitable refractory material which is bondable to the glass-ceramic material of article 32, is shown having a plurality of microcracks 34 which result from the tension shown by arrows T exerted upon the insert 30 by the glass-ceramic material of article 32. That is, as the article 32, to which insert 30 is bonded, is allowed to cool after being cerammed at elevated temperatures from its glassy or green state to its glass-ceramic state, the article having a much lower coefficient of thermal expansion than the silicon insert 30 prevents the silicon insert from shrinking or contracting, which results in the microcracking of the insert to relieve the stresses generated during cooling.

Figure 4:
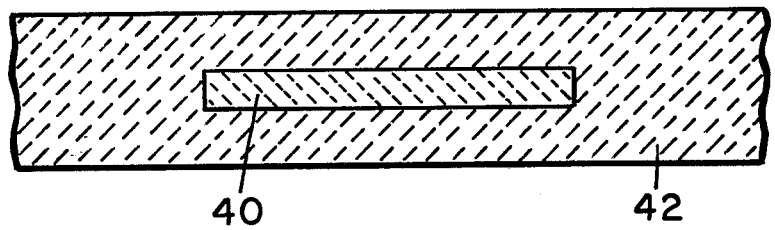
FIG. 4 is a fragmental elevational view in section illustrating a preferred encapsulation of an insert within a glass-ceramic article, wherein the insert is not bonded to the glass-ceramic, has a coefficient of thermal expansion which compensates for the stresses and deformation produced during the ceramming of the article so as to provide intimate contact between the glass-ceramic and the insert but without inducing stress, and has a modulus of elasticity which prevents an undesirable increase in stress when the article is subjected to cooking temperatures.

As previously mentioned, the embodiment shown in FIG. 2 should usually be avoided, and whereas the embodiments shown in FIG. 1 and FIG. 3 have limited value, the preferred embodiment shown in FIG. 4 includes a graphite insert 40 of desired thickness, thermal conductivity, coefficient of thermal expansion, and modulus of elasticity positioned in intimate contact with a glass-ceramic body of desired thickness. In order to better appreciate the criteria for obtaining the ultimate insert encapsulation as shown in FIG. 4, it is necessary to understand some of the background problems involved in forming such an encapsulated article.

One problem that was eluded to earlier is the fact that when forming a glass-ceramic article, the article is initially formed in a glassy state having a rather high expansion of about 30–36×10$^{-7}$/°C. and is then converted by a ceramming or heat treatment cycle into a low expansion glass-ceramic material having a coefficient of thermal expansion of about 9–12×10$^{-7}$/°C. Thus, an initial problem is the fact that the insert must be compatible with two different coefficients of thermal expansion. Further, during the ceram cycle, the material of the article volumetrically compacts and shrinks about 1–4% in its lineal dimensions due to crystallization, which change in length is separate from the usual change in length due to the coefficient of thermal expansion. As the article is heated during the ceramming cycle, the viscosity of the material drops during the nucleation stage such that it becomes flowable, however as the nucleating sites grow into crystals, the viscosity rises very rapidly and the material becomes very rigid. Thus, a further problem relating to the rate of crystallization, the shrinkage of the material and the viscosity of the material during the ceramming cycle is theorized in connection with FIGS. 5a and 5b.

Figure 5A:
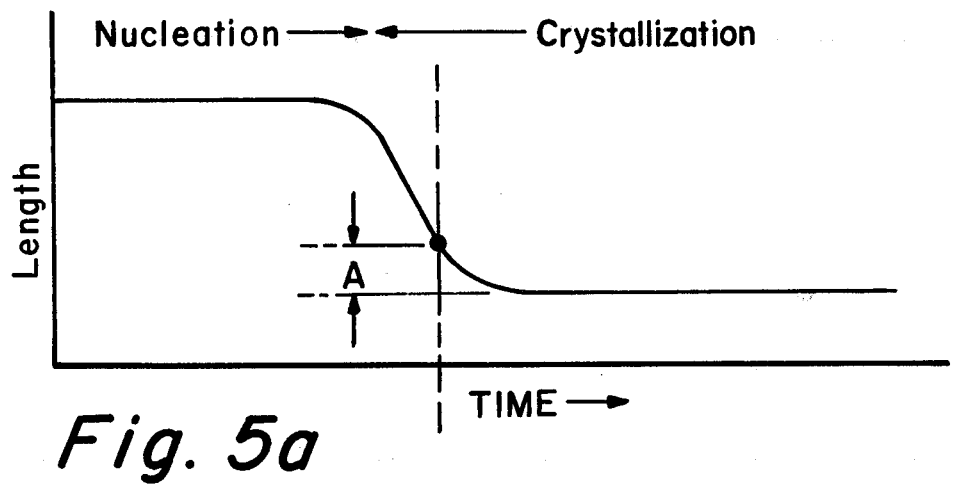
FIG. 5a and FIG. 5b are related graphs illustrating a relationship between viscosity and shrinkage as an article is transformed from a glass to a glass-ceramic during a ceramming cycle.
Figure 5B:
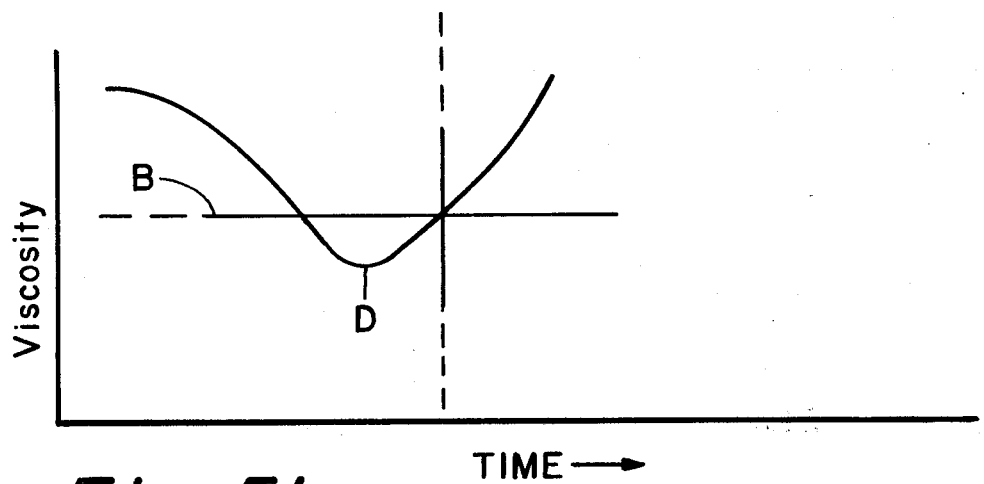

Referring now to FIGS. 5a and 5b, when a glass article, which is convertible into a glass-ceramic article and has a nonbonding insert encapsulated therewithin, is subjected to a ceramming cycle, as the material passes through the nucleation stage and enters the crystallization stage, the viscosity of the material initially decreases allowing the glass to flow and relieve any stresses which may be generated. However, at some point D, the viscosity begins to rapidly increase as crystallization takes place. Then, at some viscosity B, the glass-ceramic material becomes rigid enough so that any resistance to shrinkage, such as is occasioned by the nonbonding insert, will induce stress into the glass-ceramic material. The amount of unrelieved shrinkage that occurs above this theoretically critical viscosity is shown in FIG. 5a as the amount A. That is, the length A is the amount of shrinkage which occurs after the viscosity of the material has increased to such a level B that any strain induced thereafter will not be relieved by viscous flow. The amount of shrinkage that will occur after the viscosity has increased above level B will depend upon the glass composition of the material, the ceramming cycle utilized, and the glass thickness. In addition to the shrinkage due to crystallization, as the article cools from the relatively high ceramming temperatures (900°–1200° C.) to room temperature, a length change due to the thermal coefficient of expansion for the glass-ceramic of about 10–12×10$^{-7}$/°C. will also occur.

Since, as previously mentioned, an object of the invention is to produce an encapsulated article having an insert which provides good heat transfer within a glass-ceramic cooking vessel, not only is it necessary that the insert be of a material which does not chemically or fusion bond to the glass or glass-ceramic material but must be one which has high thermal conductivity. Further, since it is desirable that the composite article, after ceramming and when at room temperature has virtually zero stress, the coefficient of thermal expansion of the insert material must be such so that when the article cools down from the ceramming temperatures, the thermal contraction of the insert will not only compensate for the stress generated in the article due to the unrelieved shrinkage value A but also the thermal contraction of the glass-ceramic material to produce virtually zero stress within the article while maintaining intimate contact with the article to provide good heat spreading and good mechanical strength against impact damage.

A further problem involved in the manufacture of the desired composite article resides in the fact that the resulting product must be capable of being repeatedly reheated in a manner common with cooking vessels, without the insert producing excessive stresses within the product which could cause failure. Since the coefficient of thermal expansion of the insert is preselected to compensate for the unrelieved shrinkage A and the thermal contraction of the glass-ceramic as the composite article is cooled from ceramming temperatures to room temperature so as to produce virtually zero stress therewithin while maintaining firm intimate contact with the glass-ceramic, in order to reduce stress exerted by the insert on the article when it is reheated, a low modulus of elasticity is selected for the insert, and the thickness thereof is maintained at a minimum practical value compared with the thickness of the glass-ceramic surrounding such insert. Further, since the encapsulated composite must exist in both the glassy state and the glass-ceramic state, the elastic modulus of the insert must also allow and compensate for any stress buildup due to any expansion differences which may exist between the insert and the glass.

Now that the various problems confronting the manufacture of a composite cooking vessel of glass-ceramic material having a heat spreading insert encapsulated therewithin can be appreciated, the criteria necessary for producing the preferred embodiment of FIG. 4 may now be meaningfully set forth. Initially, an insert material must be chosen which does not chemically or fusion bond to the glass encapsulating medium so that expansion changes in the encapsulating medium can be accommodated, and graphite material fulfills this criteria. Further, the coefficient of thermal expansion of the graphite insert material must be higher than that of the coefficient of thermal expansion of the glass-ceramic material such that after shrinkage due to crystallization is complete, and the article cooled to room temperature, the contraction of the insert due to its coefficient of thermal expansion must be such so as to exactly compensate for the unrelieved shrinkage due to crystallization and the thermal contraction of the glass-ceramic material upon cooling. That is, as the glass-ceramic material shrinks during the ceramming cycle, the insert being expanded due to the high ceramming temperatures encountered, prevents at least a portion (theoretically designated as A) of the shrinking due to crystallization, thus inducing a stress within the encapsulating material at elevated ceramming temperatures. However by selecting the graphite with a desired coefficient of thermal expansion, the graphite will contract or shrink upon being cooled to room temperature at such a rate so as to virtually exactly compensate for the stresses developed in the article during the ceramming cycle. Typically, for a glass-ceramic having a coefficient of thermal expansion of about $36 \times 10^{-7}/°C$. in the glassy state and converted by a commercial ceram cycle to produce a glass-ceramic having a coefficient of thermal expansion of about $9 \times 10^{-7}/°C$. in the glass-ceramic state, a graphite with a coefficient of thermal expansion of about $40-50 \times 10^{-7}/°C$., or less than about $20 \times 10^{-7}/°C$. higher than that of the glass, compensates for both the unrelieved shrinkage and the thermal contraction of the encapsulating material so as to result in substantially zero stress within the composite article at room temperature. It must be kept in mind, however, that the expansion of the insert cannot be allowed to be above the point at which it exactly compensates for the shrinkage of the encapsulating material, since it would have a tendency to shrink away from the glass-ceramic in a manner shown in FIG. 1, which would not only result in poor thermal heat transfer when the article is utilized in its intended cooking mode, but also with the insert loosely positioned within the glass-ceramic, resistance to impact damage is seriously reduced.

In addition to selecting the proper coefficient of thermal expansion for the graphite insert, it is also necessary to select a graphite having a high thermal conductivity so as to provide the desired heat spreading in the cooking vessel and one having a low modulus of elasticity so as to minimize the buildup of stresses within the encapsulating article during ceramming and during periodic reheating such as when the vessel is used for cooking. During the crystallization phase at elevated temperatures, the amount of stress developed within the encapsulating material not only depends upon the amount of unrelieved shrinkage A due to crystallization, but also the amount of deformation that the insert will realize due to its modulus of elasticity, and accordingly it is preferable that the insert have a low modulus of elasticity compared to the glass so that it will in effect be quite flexible and resilient when compressive forces are exerted thereon by the encapsulating material. Further, the amount of deformation obtainable from the insert is dependent upon the glass thickness on opposite sides of the insert and the thickness of the insert per se, and accordingly it is desirable to provide an insert which is relatively thin compared to the glass-ceramic surrounding the same, so that the insert will offer minimal resistance to the glass-ceramic during reheating. Typically, if the glass-ceramic on each side of the insert is about 0.1" to 0.2", the insert should preferably have a thickness of from about 0.04" to about 0.08", or not exceeding 1/5 the total glass thickness surrounding opposite sides of the insert. Typically, for a glass-ceramic material having a modulus of elasticity of about $8-15 \times 10^6$ psi, the modulus of elasticity for the graphite insert should be about $0.5-2 \times 10^6$ psi.

Finally, in order to minimize the theoretical value A, which represents an amount of shrinkage that occurs due to crystallization after the viscosity of the glass-ceramic has increased to a point where strain cannot be relieved, it is desirable to utilize glass-ceramic compositions and ceramming schedules which achieve the desired minimization. Accordingly compositions which are set forth in Table I of U.S. Pat. No. 4,018,612 when subjected to relatively fast commercial ceramming cycles produce the desired results.

Ideally, the coefficient of thermal expansion of the insert material should be such that it compensates for the stress and deformation produced during the ceramming cycle. At the present time, graphite and low expansion materials such as specialty materials, coated with graphite are deemed to be the most suitable insert materials for top-of-range cookware. Not only does the graphite have good thermal conductivity for spreading heat within the vessel when used in conventional cooking, but also the graphite acts as a susceptor for coupling the vessel to induction heating. Specifically, for glass-ceramic materials having a coefficient of thermal expansion in the glassy state of about $35 \times 10^{-7}/°C$. and a coefficient of thermal expansion in the cerammed or glass-ceramic state of about $10 \times 10^{-7}/°C$., it presently appears that an insert of graphite material having a coefficient of thermal expansion of about $45 \times 10^{-7}/°C$. produces a snuggly fitting, virtually stress free, compatible composite at room temperature. That is, if the initially formed composite in the glassy state is allowed to cool sufficiently prior to subjecting it to a cerammming cycle, the graphite insert, having a greater coefficient of thermal expansion than the glass, might shrink away from the glass leaving a cavity such as shown in FIG. 1. However in such case, when the composite is reheated during the ceramming cycle, the graphite will expand outwardly to the outer limits of its cavity and as the glass is converted into a glass-ceramic and is subjected to a volumetric shrinkage, the insert is placed under compressive stress by the shrinking glass-ceramic material, which as previously mentioned produces unrelieved stress in the glass-ceramic as the viscosity rises. The resulting stress is relieved, however, as the ware cools from the high ceramming temperatures to room temperature, since the graphite insert has a much higher expansion than that of the glass-ceramic, and accordingly as the ware reaches room temperature, virtually zero stress exists between the insert and the glass-ceramic, even though the insert and the surrounding glass are maintained in intimate contact, which is necessary for both good heat spreading and resistance to failure due to impact.

When such an article is utilized for top-of-the-stove cookware, the insert will again expand when subjected to the heat of the stove. However, the low modulus of elasticity and relative thinness of the graphite insert inhibit a build-up of stress within the composite during such reheating, and in fact stress increases of only a few hundreds of psi result, which is well within the limits of commercially annealed products.

Referring now to FIG. 4, an ideal or preferred encapsulation situation is shown. That is, an insert 40 of graphite, which does not chemically or fusion bond to the glass or glass-ceramic of article 42, having a relatively low modulus of elasticity, a relatively high thermal conductivity, and a higher coefficient of thermal expansion than that of both the glassy state and the ceramined state of such article 42, is shown encapsulated within and in intimate contact with the article 42 with virtually no stress exerted therebetween at room temperature.

The following specific example of a preferred embodiment is set forth to more specifically illustrate the invention but is not deemed to be limiting in nature. A composite glass-ceramic cooking vessel having a graphite insert encapsulated therewithin was press formed in the manner set forth in my copending patent application filed on even date, Ser. No. 51,711 entitled Press Forming Glass Articles Having Encapsulated Material. The graphite insert was in the form of a disc having a diameter of about 166 mm and a thickness of about 1.4 mm. The graphite insert had a coefficient of thermal expansion of $47 \times 10^{-7}/°C.$, a thermal conductivity of 0.3 cal./sec.-cm-°K., a modulus of elasticity of $1.69 \times 10^6$ psi, a density of 1.9 and electrical resistivity of 1270 ohm-cm $\times 10^6$. The glass utilized had a composition similar to Example 7 set forth in Table I of U.S. Pat. No. 4,018,612, but with the addition of 0.002 $Co_3O_4$ as a colorant. In the glassy state, the encapsulating material had a coefficient of thermal expansion of $36 \times 10^{-7}/°C.$, whereas in the cerammed or glass-ceramic state, the material had an expansion of about $10 \times 10^{-7}/°C.$ The modulus of elasticity of the encapsulating material was about $13 \times 10^6$ psi whereas the thermal conductivity was about 0.003 cal/sec.-cm-°K.

The total thickness of the vessel portion containing the graphite insert was 7.4 mm, with the thickness of the graphite disc being 1.4 mm and a 3 mm thickness of glass-ceramic material on each side of the disc encapsulated therewithin. The ceramming cycle utilized to convert the glass to a glass-ceramic material included the raising of the composite to the nucleation temperature range of about 750° C.–780° C. in about 10 minutes and holding the composite in the nucleation range for about 22 minutes and then raising the temperature of the article to the crystallization temperature range of 920°–940° C. in about 16 minutes, maintaining the article at the crystallization temperature for about 12 minutes and then cooling to room temperature. This procedure produced a composite article having a graphite insert in intimate contact with a glass-ceramic encapsulating body and at virtually no stress at room temperature. Not only does the graphite insert provide good heat distribution or heat spreading when the vessel is utilized on a conventional rangetop, but also the graphite acts as a susceptor so as to provide a coupler for cooking by induction heating. Further, during reheating cycles wherein the vessel is subjected to cooking temperatures, the stress buildup did not exceed 150 psi, or well within the limits of commercially annealed products.

There is also the possibility that a glass system may be found wherein the viscosity of the material at the maximum ceramming temperature will be low enough so that stresses will be completely relieved at that point. If such a viscosity condition existed so that stresses were relieved at the elevated ceramming temperature, a non-bonding insert having a coefficient of thermal expansion equal to the ceramic expansion would be an ideal situation, since upon cooling there would be intimate contact between the insert and article but with no stress.

Although the now preferred embodiments of the invention have been disclosed, it will be apparent to those skilled in the art that various changes and modifications may be made thereto without departing from the spirit and scope thereof as defined in the appended claims.

I claim:

1. A method of forming a composite glass-ceramic cooking vessel having a heat conducting insert fully encapsulated therewithin which comprises, supplying molten glass having a first coefficient of thermal expansion, supplying a heat conducting insert which does not chemically or fusion bond to the molten glass and which has a second coefficient of thermal expansion which is less than $20 \times 10^{-7}/°C.$ greater than the first coefficient of thermal expansion of the molten glass, fully encapsulating said insert within said molten glass, cooling said molten glass and the encapsulated insert to form a composite glass article having an insert fully encapsulated therewithin, contracting the insert upon cooling at a greater rate than that of the glass during said cooling, subjecting the composite article to elevated temperatures and converting the glass to a glass-ceramic article, shrinking the glass-ceramic article while at elevated temperatures about said insert and simultaneously inducing stress in said article, and cooling said composite glass-ceramic article to room temperature while simultaneously contracting said insert at a greater rate than that of said glass-ceramic article and thereby relieving the stress induced in said article to form a glass-ceramic cooking vessel having a heat conducting insert fully encapsulated therewithin.

2. A method of forming a composite glass-ceramic cooking vessel having an insert fully encapsulated therewithin as defined in claim 1 including the step of supplying an insert of graphite material which has a coefficient of thermal expansion greater than that of the glass and a modulus of elasticity of between about $0.5 \times 10^6$ psi and $2 \times 10^6$ psi.

3. A method of forming a composite glass-ceramic cooking vessel having an insert fully encapsulated therewithin as defined in claim 1 including the step of selecting said second coefficient of thermal expansion so as to compensate for the stress and deformation caused by said shrinkage such that upon cooling said composite glass-ceramic article to room temperature, said article will remain in intimate contact with said insert with virtually no stress generated therebetween so as to provide improved heat transfer capabilities within said glass-ceramic cooking vessel.

4. A method of forming a composite article having an insert fully encapsulated therewithin which comprises, supplying molten glass having a first coefficient of thermal expansion, supplying a silicon insert which is bondable to said article, fully encapsulating said insert within said molten glass, cooling said molten glass and the encapsulated insert to form a composite glass article having an insert bonded thereto and fully encapsulated therewithin, subjecting said composite glass article to a thermal cycle and converting such article to a composite glass-ceramic article, said silicon insert having a second coefficient of thermal expansion which is greater than the coefficient of thermal expansion of the glass-ceramic forming said article, cooling the composite article and contracting the bonded insert at a greater rate than the glass-ceramic, and thereby placing the insert in tension and forming microcracks within said insert which relieve the tension imparted thereto by the differential contraction between the bonded insert and the encapsulating glass-ceramic article.

5. A method of forming a composite glass-ceramic article having an insert fully encapsulated therewithin which comprises, supplying molten glass having a first coefficient of thermal expansion, supplying a heat conductive graphite insert having a second coefficient of thermal expansion which is greater than said first coefficient of thermal expansion, fully encapsulating said graphite insert within said molten glass and forming a composite glass article having an insert encapsulated wholly therewithin, subjecting said encapsulated glass article to a thermal cycle and converting said glass article to a glass-ceramic article, volumetrically shrinking said glass-ceramic article about said insert during said thermal cycle and inducing stresses within said article, cooling said glass-ceramic article to room temperature and contracting said insert at a rate greater than the contraction of said glass-ceramic article, and during said cooling relieving said stresses induced in said article by said volumetric shrinkage, and said coefficient of thermal expansion of said insert being selected such that said encapsulated heat conductive insert is snugly retained in a virtually stress-free relationship within said glass-ceramic article at room temperature.

6. A method of forming a composite glass-ceramic article having an insert fully encapsulated therewithin as defined in claim 5 including the steps of supplying said graphite insert with a second coefficient of thermal expansion which is less than $20 \times 10^{-7}/°C.$ greater than said first coefficient of thermal expansion, cooling said molten glass and the encapsulated insert after forming the composite glass article, and contracting said insert within said glass article at a greater rate than the rate of contraction of said glass article during said cooling.

7. A method of forming a composite glass-ceramic article having an insert fully encapsulated therewithin as defined in claim 5 including the steps of supplying a heat conductive graphite insert having a second coefficient of thermal expansion which compensates for the stress and deformation caused by the volumetric shrinkage of the glass-ceramic article during the thermal cycle such that virtually no stresses are exerted between the insert and the article at room temperature, and while cooling said glass-ceramic article to room temperature maintaining said article in intimate contact about said heat conductive graphite insert and thereby facilitating improved heat transfer within said glass-ceramic article.

8. A method of forming a composite glass-ceramic article having an insert fully encapsulated therewithin as defined in claim 5 including the steps of supplying a heat conductive graphite insert having a second coefficient of thermal expansion which compensates for the stress and deformation caused by the volumetric shrinkage of the glass-ceramic article during the thermal cycle so that virtually no stress exists between the article and the insert at room temperature, and supplying said heat conductive graphite insert having a modulus of elasticity of between about $0.5 \times 10^6$ psi. and $2 \times 10^6$ psi. which is relatively low compared to that of said glass such that upon reheating said article for cooking purposes, said heat conductive graphite insert provides improved heat transfer within said glass-ceramic article with only minimal stresses compared to commercially tempered ware being generated between said insert and said article.

9. A method of forming a composite glass-ceramic article having an insert fully encapsulated therewithin as defined in claims 7 or 8 including the step of supplying a disc-like heat conductive graphite insert which does not chemically or fusion bond to the glass-ceramic article, which has a modulus of elasticity less than the modulus of elasticity of said glass-ceramic material forming said article, and which has a total thickness not exceeding 1/5 of the total glass-ceramic thickness surrounding opposite sides of said insert.

10. An integral glass-ceramic article for supporting material to be heated having an insert fully encapsulated therewithin which comprises, an integral body portion of glass-ceramic material having a first coefficient of thermal expansion and a first modulus of elasticity, a heat-conductive graphite insert fully embedded within said glass-ceramic article having a second coefficient of thermal expansion greater than said first coefficient of thermal expansion and a second modulus of elasticity less than said first modulus of elasticity, said coefficient of thermal expansion of said graphite insert being selected so that said graphite insert is in intimate contact with said glass-ceramic body at room temperature without exerting undesirable stresses therebetween, and said graphite insert providing improved heat transfer within said glass-ceramic article upon application of heat to said article.

11. A composite glass-ceramic article as defined in claim 10 wherein said graphite insert is of a disc shape embedded within a surface of said glass-ceramic article and has a modulus of elasticity of between about $0.5 \times 10^6$ psi. and $2 \times 10^6$ psi, and a total thickness not exceeding 1/5 of the total glass-ceramic thickness of said surface surrounding opposite sides of said heat conductive graphite insert.

* * * * *